United States Patent Office.

WILLIAM LANDERT AND JOHN DEGGELLER, OF CHICAGO, ILLINOIS.

Letters Patent No. 102,686, dated May 3, 1870.

IMPROVEMENT IN COMPOUNDS FOR TREATING RHEUMATISM.

The Schedule referred to in these Letters Patent and making part of the same.

*To all whom it may concern:*

Be it known that we, WILLIAM LANDERT, M. D., and JOHN DEGGELLER, M. D., both of Chicago, in the county of Cook and State of Illinois, have invented an Improved Medicine for the Cure of Rheumatism; and we do hereby declare that the following is a full, clear, and exact description thereof.

This invention relates to the cure of rheumatism and other diseases; and

It consists in the combination or compounding of certain ingredients, which will be hereinafter described, as will also the method of administering them.

It is well known that rheumatism and its kindred diseases require very active and powerful remedies, and that they invariably resist the ordinary forms of treatment for a long time, and in cases of long standing, or which have become chronic in their character, they not unfrequently resist all known forms of treatment and all known kinds of medicine.

Our object in the present invention is to provide a remedy for the worst as well as for the milder forms of this and other diseases, which will be effectual in its operation and certain in its results, which are the permanent removal of the disease and the leaving of the patient free from the injurious effects of poisonous drugs.

To enable those skilled in the art to prepare and administer our remedy, we will proceed to describe it and the method of its administration.

This medicine or remedy consists of four different compounds, but all necessary to the production of one result, the first being necessary to the preparation of the system for the successful operation of the next, and so on through the whole series.

The first combination or compound, which is intended for bathing purposes, and may be termed "bathing-tea," consists of the following ingredients, and in substantially the following proportions:

Baccæ juniperi, one pound; folia rosmarini, one-half pound; herba menthæ, one and one-half ounce; herba serpylli, two ounces; herba chenopodium ambrosioides, two ounces; flores arnicæ, two ounces; radix pyrethri, one-half ounce.

These ingredients are to be thoroughly mixed, and, when used, about three-quarters of a pound will be required for each bath.

Our second compound of the series, in the order in which they are to be used, consists of the following named ingredients, to be used in the form of pills, a mild form of which may consist of the following proportions:

Extract colocynthidis, one-half grain; extract aloes, two grains; extract jalapæ, two grains; extract aconiti, one and one-half grain; extract colchici, one grain; extract toxicodendri, one-half to two-thirds of a grain; pulv. rad. rhei, five grains; pulv. rad. myrrhæ, one-half grain; pulv. rad. aloes, one-half grain; oleum menthæ piperitæ, one drop; oleum absynthi, one drop.

When a stronger and more active preparation is required the pills may consist of the same ingredients, but in the following proportions:

Extract colocynthidis, one grain; extract aloes, three grains; extract jalapæ, three grains; extract aconiti, one and one-half grain; extract colchici, one grain; extract toxicodendri, two-thirds of a grain; pulv. rad. rhei, six grains; pulv. rad. myrrhæ, one-half grain; pulv. rad. aloes, one-half grain; oleum menthæ piperitæ, one drop; oleum absynthi, one drop.

These ingredients are to be thoroughly mixed together in any convenient manner, and made into eight pills.

The third of the series of our remedies consists of an ointment, compounded or combined as follows:

Axungia porci, colored red with a sufficient quantity of radix alcanuæ, ten drops; oleum rosmarini, ten drops; oleum juniperi, ten drops; oleum cajeputi, ten drops; aconitini and veratrini, two grains of each, to be dissolved in a little spirit vini; nitrate of lead, fifteen to twenty grains.

As in the previous cases, these ingredients are to be thoroughly mixed, when they may be placed in bottles or in other convenient vessels for use.

The fourth and last of the series of our remedies consists of a liniment, consisting of the following named ingredients:

Veratrini, seven grains; aconitini, two grains; spirit vini rect., twelve ounces; ætheris sulph., two ounces; oleum rosmarini, one dram; oleum rutæ, one dram; oleum cajeputi, one dram; oleum caryophyllorum, one dram; oleum lavendulæ, one dram; oleum cinnamoni acuti, one dram; oleum citri, one dram; oleum thymi, one dram; oleum menthæ piperitæ, one-half dram; oleum macidis, one-half dram; oleum salviæ, one dram; oleum moschi vegetabilis, one-half dram; oleum juniperi, one-half dram; oleum absynthi, one-half dram; oleum carvi, one-half dram; oleum anisi, one-half dram; oleum ætheris animalis, one-half dram; oleum fœniculi, one-half dram; oleum valerianæ æth., one-half dram; oleum chamonillæ, one-half dram; balsam peruviani, one and one-half to two drams.

These ingredients, after having been thoroughly mixed, should be allowed to stand for a few days in a room the temperature of which is from seventy to ninety degrees, when they will be ready for use.

The method of applying these remedies or this remedy, as it consists really of but one, having a series of applications, is as follows:

A quantity of the tea prepared as herein described, amounting to from two-thirds to three-fourths of a pound, is to be placed in a common wash-boiler or any other suitable vessel, in which it may be mixed with a sufficient quantity of water and raised to the boiling-point or steaming temperature. The patient is to be denuded and covered with blankets, or oil-cloth or rubber-cloth, so as to retain the heat next to the person. In this position the patient is to remain for, say, twenty minutes, or until the perspiration flows freely. During the steaming-process the patient should drink one or two cups of the tea which has been prepared in a separate vessel.

After the patient has been kept perspiring for the required length of time, he is to be removed to the bed, wrapped in the same blankets, where he should remain for one hour, during which time he should drink another cup of the tea, as hot as possible.

At the expiration of this time the patient should be rubbed with warm cloths until the skin is perfectly dry, when an application of the liniment is to be made with the hand to all the affected parts, the quantity to be used being from twenty to sixty drops.

The ointment is to be applied only when swelling occurs as a consequence of rheumatism, in which cases it is to be rubbed upon all such swelled parts every two hours, until the swelling subsides.

The pills are to be taken about three hours after supper and three hours before breakfast, in doses of from three to four pills each time.

We have described our remedy as principally applicable to the cure of rheumatism, but it will be found that application of the steam-bath will be advantageous in the treatment of neuralgia, catarrh, and other diseases caused by or resulting from colds.

Having thus described our invention,

What we claim, and desire to secure by Letters Patent, is—

1. The combination or compounding of the ingredients which are named in the first division, or as constituting the "herb steam-bath" or "bathing-tea," in substantially the quantities described, it being for the purpose set forth.

2. The compounding or combining of the ingredients named in the second divison as constituting the pills, in substantially the quantities specified, it being for the purpose set forth.

3. The compounding or combining of the ingredients named in the third division as constituting an ointment, in substantially the quantities specified, it being for the purpose set forth.

4. The compounding or combining of the ingredients named in the fourth division as constituting a liniment, in substantially the quantities specified, it being for the purpose set forth.

In testimony whereof we have signed our names to this specification in the presence of two subscribing witnesses.

DR. WM. LANDERT.
DR. JOHN DEGGELLER.

Witnesses:
 FRANCIS ROLLE,
 MORRIS HEILBORN.